(12) United States Patent
Brown

(10) Patent No.: US 7,117,606 B2
(45) Date of Patent: Oct. 10, 2006

(54) POCKET-SIZED LEVELING TOOL

(76) Inventor: David A. Brown, 1615 W. Sadler Hill Rd., Logansport, IN (US) 46947

( * ) Notice: Subject to any disclaimer, the term of this patent is extended or adjusted under 35 U.S.C. 154(b) by 0 days.

(21) Appl. No.: 10/900,236

(22) Filed: Jul. 27, 2004

(65) Prior Publication Data
US 2006/0021239 A1 Feb. 2, 2006

(51) Int. Cl.
*G01C 9/34* (2006.01)
(52) U.S. Cl. .............. 33/365; 33/451; 33/370; 33/DIG. 1
(58) Field of Classification Search ........... 33/365, 33/451, 429, 370, 371, 376, 377, 379, 381, 33/382, DIG. 1
See application file for complete search history.

(56) References Cited

U.S. PATENT DOCUMENTS

| 2,535,791 | A | * | 12/1950 | Fluke | 33/347 |
| 2,695,949 | A | * | 11/1954 | Ashwill | 33/381 |
| 2,789,363 | A | * | 4/1957 | Miley | 33/347 |
| 2,939,947 | A | * | 6/1960 | Schultz | 33/348.2 |
| D228,948 | S | | 10/1973 | de Jong | |
| 3,832,782 | A | * | 9/1974 | Johnson et al. | 33/451 |
| 4,590,682 | A | | 5/1986 | Koch | |
| 4,593,475 | A | * | 6/1986 | Mayes | 33/371 |
| 5,127,167 | A | | 7/1992 | Kennedy | |
| 5,419,054 | A | * | 5/1995 | Stoneberg | 33/474 |
| 5,522,147 | A | * | 6/1996 | Tully et al. | 33/567 |
| 6,026,581 | A | | 2/2000 | Gruetzmacher | |
| 6,029,360 | A | | 2/2000 | Koch | |
| 6,233,789 | B1 | | 5/2001 | Douglas | |
| 6,568,095 | B1 | | 5/2003 | Snyder | |
| 2003/0005590 | A1 | | 1/2003 | Snyder | |

FOREIGN PATENT DOCUMENTS

| EP | 161209 A2 | * | 11/1985 |
| GB | 2088068 A | * | 6/1982 |
| GB | 2230044 A | * | 10/1990 |

* cited by examiner

*Primary Examiner*—Christopher W. Fulton
(74) *Attorney, Agent, or Firm*—Sommer Barnard PC; Keith Swedo; Sarah Jabbari

(57) ABSTRACT

A leveling tool having: a body, including a first face and an opposite second face, the first and second faces defining a thickness between them, the body defining a first side surface, a second side surface opposite said first side surface, a first end surface, and a second end surface substantially opposite said first end surface; at least one level indicator disposed within the thickness; and a clip removably attachable to each of the first and second faces.

14 Claims, 5 Drawing Sheets

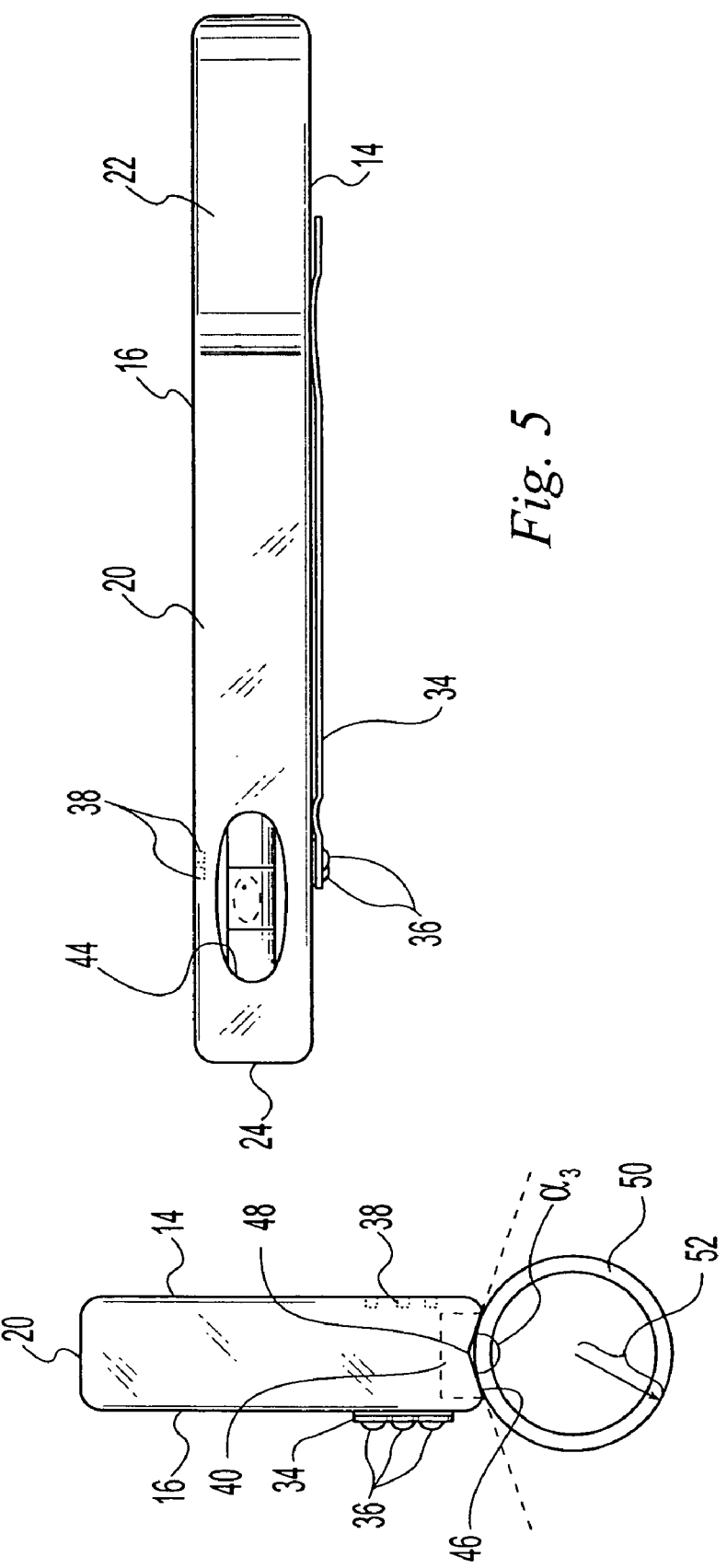

POCKET-SIZED LEVELING TOOL

BACKGROUND OF THE INVENTION

1. Field of the Invention

The field of the present invention relates to measuring tools and devices, and more particularly compact leveling tools.

2. Description of the Related Art

Leveling tools are commonly used in a variety of industrial fields. In their most basic form, they allow the user to determine whether a surface is level. Leveling tools typically consist of a transparent sealed vial that is mounted in a frame. The vial contains some liquid, typically a non-polar liquid such as alcohol or ether, but is not entirely filled. This allows a small bubble of gas to remain in the vial. Since the vial is sealed, the position of the gas bubble within the tube indicates whether the vial is level. The frame includes a long flat side surface often oriented parallel to the vial. The flat side surface may be placed on a flat surface to quickly and accurately determine whether the flat surface is level.

The spirit level, used by many workers in building construction, has two or more level vials positioned at right angles with respect to each other. This allows the leveling tool to register vertical as well as horizontal positions. Such spirit levels have been in common use for hundreds of years. Typical levels are often several feet in length.

One particular type of spirit level is the "torpedo" (or canoe) level, so named for its shape. "Torpedo" levels are typically small (often as small as 2 or 3 inches) and have tapered ends. The body of such levels generally contain two or three level vials. The "torpedo" level is useful for making measurements in small spaces and may be carried in a toolbox or pocket.

Several attempts have been made to improve levels including: adding magnets to the face or side surface of the leveling tool to allow it to be temporarily fixed to metal surfaces, providing additional level vials at different angles to allow leveling at multiple angles/orientations, indenting the side surface of the body to allow it to more easily rest upon cylindrical surfaces, and adding movable parts that allow for adjusting relative positions of the level vials with respect to the body of the level. Despite these improvements, a need remains for an improved leveling tool that simply and effectively levels at multiple angles, that can be inserted into confined work spaces, and that is easily transported and carried on a job site.

SUMMARY OF THE INVENTION

The present invention is directed to a leveling tool that may be easily carried by the user, that is useable within confined spaces of various geometries, and that may be used to level at multiple angles. A leveling tool according to one embodiment of the present invention includes a substantially trapezoidal body and at least one level vial. The substantially trapezoidal body includes a first face and an opposite second face. The first and second faces define a thickness between them. The thickness is bordered by a first side surface, a second side surface opposite the first side surface, a first end surface, and a second end surface substantially opposite the first end surface. The first and second side surfaces are arranged parallel to one another. The first and second end surfaces are arranged in non-parallel relationship to one another and extend contiguously between the first and second side surfaces. The first end surface defines a non-perpendicular first angle relative to the first side surface and a second non-perpendicular angle relative to the second side surface. At least one level vial is disposed within the thickness and is visible from the first and second faces. The at least one level vial includes a first level vial arranged parallel to the first end surface.

In another form, the leveling tool according to the present invention includes a body, at least one level vial, and a clip. The body includes a first face and an opposite second face. The first and second faces define a thickness between them. The body defines a first side surface, a second side surface opposite the first side surface, a first end surface, and a second end surface substantially opposite the first end. The first and second side surfaces are arranged parallel to one another. The first and second end surfaces are arranged in a non-parallel relationship to one another and extend contiguously between the first and second side surfaces. The first end surface defines a non-perpendicular first angle relative to the first side surface and a second non-perpendicular angle relative to the second side surface. The at least one level vial is disposed within the thickness and is visible from the first and second faces. The clip is selectively attachable to one of the first or second faces such that a distal end of the clip is closer than a proximal end of the clip to the first end surface.

In yet another form, the leveling tool includes a body, at least one level indicator, and a clip. The body includes a first face and an opposite second face. The first and second faces define a thickness between them. The body defines a first side surface, a second side surface opposite the first side surface, a first end surface, and a second end surface substantially opposite the first end surface. The at least one level vial is disposed within the thickness. The clip is removably attachable to each of the first and second faces.

An advantage of the present invention is that the size and shape of the leveling tool enables the tool to be inserted into small spaces to check the leveling of surrounding objects.

Another advantage is that a V-groove along the longest side of the tool allows the tool to be seated with a high level of stability on a cylindrical structure to be leveled.

Yet another advantage is that the tool includes a number of magnets that enable the tool to be securely retained on a metal structure when leveling is being performed such that the user's hands are free for other purposes.

A further advantage is that a clip may be selectively attached to either face of the tool such that the tool can be configured for either a right-handed user or a left-handed user.

A still further advantage is that one end of the body of the tool is wedge-shaped such that the user can easily guide the tool into a pocket with the clip hanging on a lip of the pocket.

Still another advantage is that the wedge-shaped end provides the two opposite faces of the tool with different shapes such that one of the two faces may be better suited for the particular geometry of a surface to be leveled.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, where:

FIG. 4 shows a second end surface view of the tool of FIG. 3;

FIG. 5 shows a second side surface view of the tool of FIG. 2; and

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
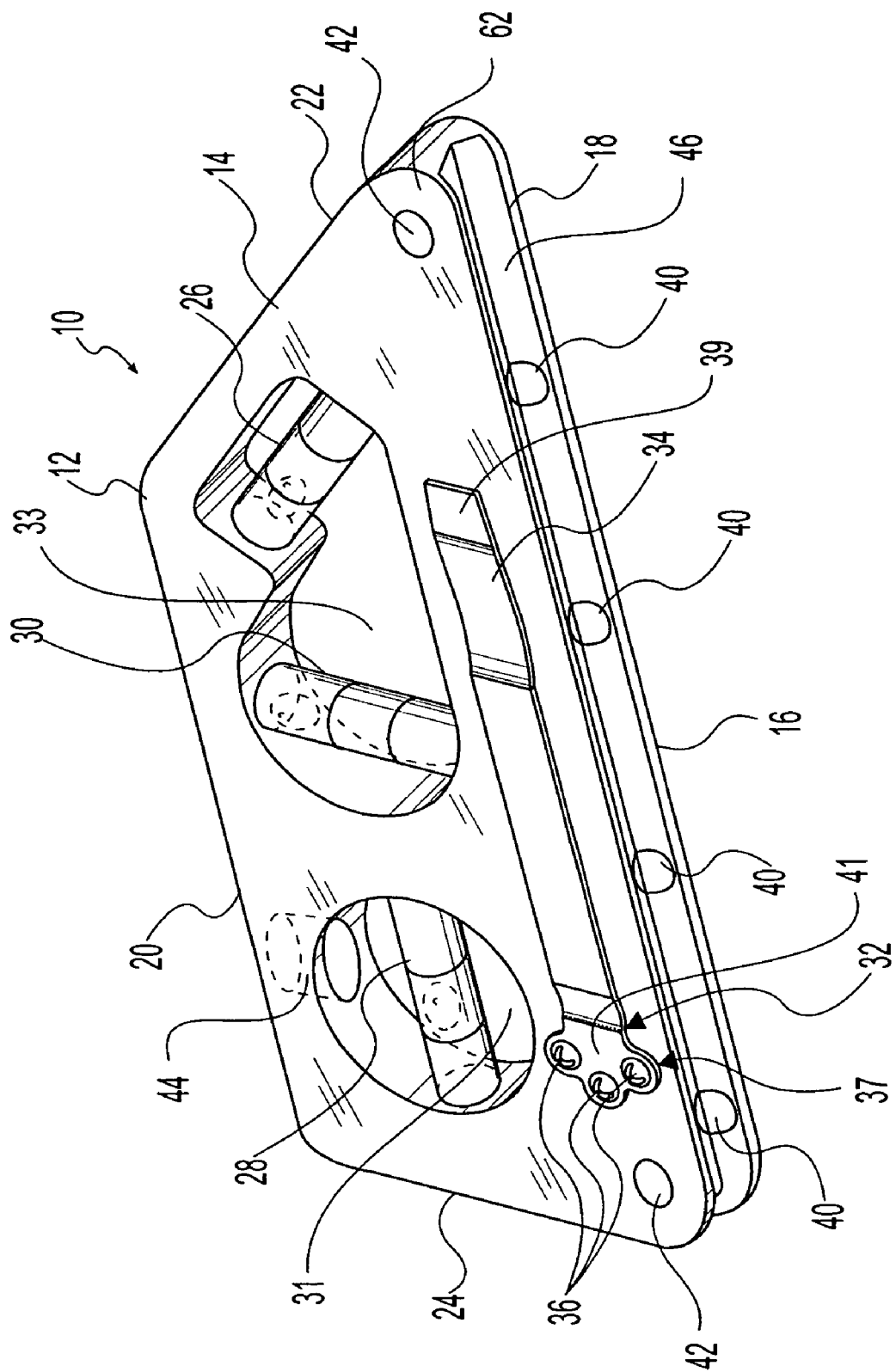
FIG. 1 shows a first face perspective view of a leveling tool according to one embodiment of the present invention.
Figure 2:
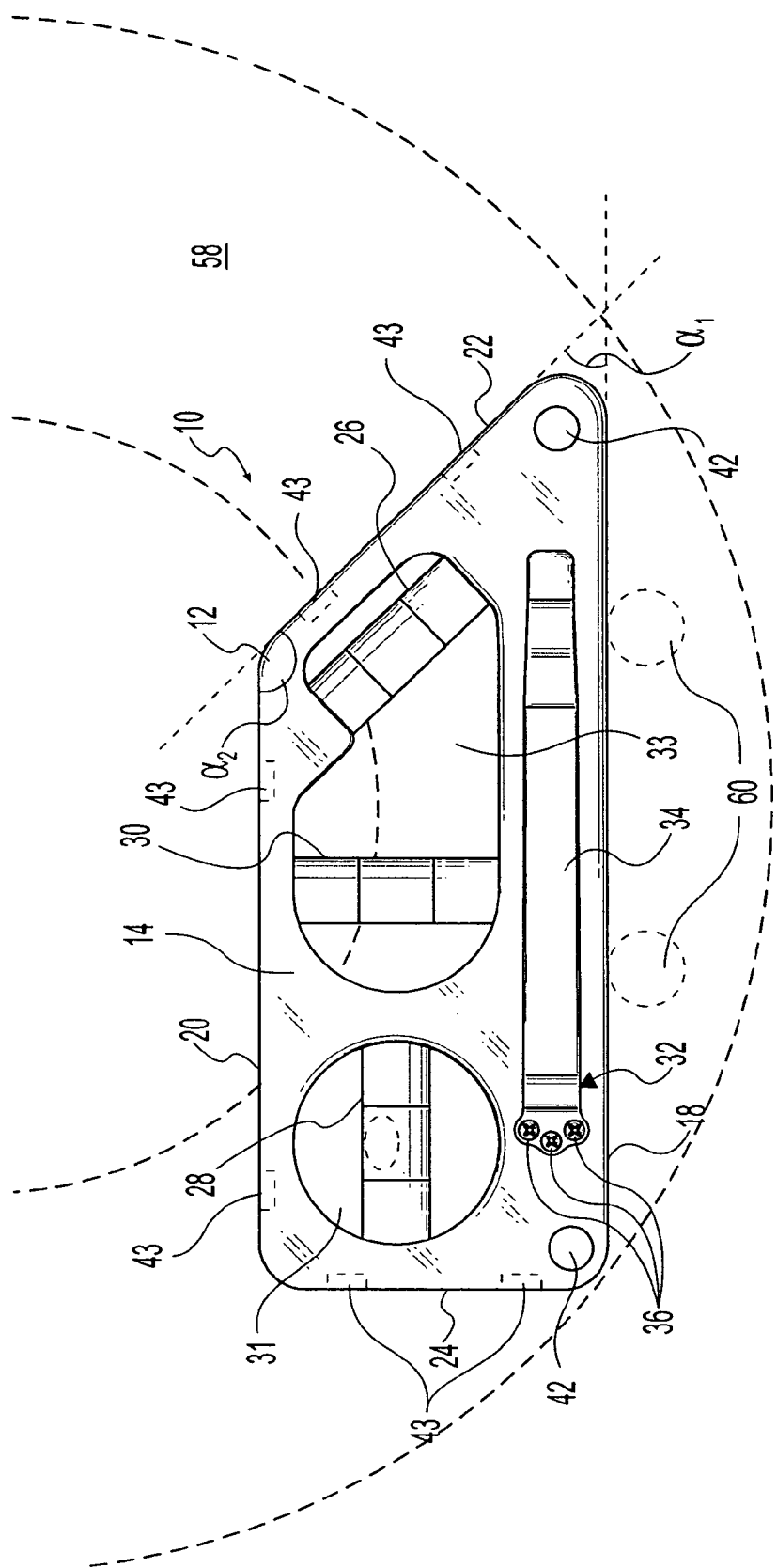
FIG. 2 shows a first face view of the tool of FIG. 1.

As shown in FIGS. 1 AND 2, a leveling tool 10 having features of the present invention comprises a trapezoidal body 12, a plurality of level indicators in the form of level vials 26, 28, 30, and a clip assembly 32. The body 12 has a first face 14 and an opposite second face 16, which define a thickness between them. The thickness of body 12 is bordered by a first side surface 18 and a second side surface 20, which may be arranged parallel to one another. The thickness of body 12 may also be bordered by a first end surface 22 and a second end surface 24, which may be arranged in a non-parallel relationship and extend contiguously between the first side surface 18 and the second side surface 20. Each of faces 14, 16 and surfaces 16, 18, 20, 22 may have a sufficient degree of flatness that any one may be used for leveling. Body 12 may be formed from a durable material. Suitable materials include aluminum, steel, and plastic; however any durable material with sufficient hardness may be used.

In one embodiment, the thickness of body 12 is approximately 0.63 inch. However, the thickness may vary. In one embodiment, the length of first side surface 18 is approximately 5.0 inches, the length of second side surface 20 is approximately 3.5 inches, the length of first end surface 22 is approximately 2.3 inches, and the length of second end surface 24 is approximately 1.8 inches. In one embodiment, the four corners of body 12 at the opposite ends of surfaces 18, 20, 22, 24 each have a radius of approximately 0.25 inch. In one embodiment, surfaces 18, 20, 22, 24 each have chamfers of approximately 0.13 inch along each of their side edges.

Vials 26, 28, and 30 are disposed in vial frame passages 31, 33 within the thickness of the body 12. The first level vial 26 is arranged parallel to the first end surface 22. The second level vial 28 is arranged parallel to the first and second side surfaces 18, 20. The third level vial 30 is arranged parallel the second end surface 24. Any or all of vials 26, 28, 30 may be parallel to both first face 14 and second face 16. Further, vials 26, 28, 30 may be co-planar with each other. The level vials 26, 28, 30 may be partially filled with a colored fluid and sealed such that a bubble of air remains in the sealed vial. The level vials 26, 28, 30 may be formed of transparent plastic material that allows the user to easily see bubbles within the vials. Additionally, the level vial may have a slightly larger diameter at the center, this allowing the air bubble to be centrally justified when the level is horizontal. In one embodiment, vials 26, 28, 30 have diameters of approximately 0.4 inch and lengths of 1.4 inch, with only about 1.0 inch of the length being visible through vial frame passages 31, 33. In one embodiment, passages 31, 33 have chamfers of approximately 0.06 inch along their perimeters. The vials 26, 28, 30 indicate a level position when the air bubble contained within the vial is positioned within the line markings, which indicate the center of the vial. Such markings allow for easy reading of the level vials to visually determine whether they are level.

As shown in FIG. 2, the leveling tool 10 of FIG. 1 allows the measuring of 45 degree and 135 degree angles. The first end surface 22 defines a first angle $\alpha_1$ relative to the first side surface 18. The first angle $\alpha_1$ measures approximately 45 degrees. The first end surface 22 defines a second angle $\alpha_2$ relative to the second side surface 20. The second angle $\alpha_2$ measures approximately 135 degrees.

Attached to the first face 14 of the body 12 is a clip assembly 32. The clip assembly 32 includes a clip 34 and a plurality of attachment members 36, which may be in the form of threaded screws. The clip assembly 32 is removably and selectively attached to the first face 14 by that plurality of attachment members 36. Attachment members 36 extend through throughholes (not shown) in clip 34 and engage a mating portion 37 including mating openings 38 (FIGS. 4 and 5) defined in body 12. Mating openings 38 may be in the form of threaded screw holes. Both first face 14 and second face 16 of body may include a mating portion 37 having openings 38. Thus, clip 34 may be attached to either first face 14 or second face 16 depending on the preference of the user and whether one of faces 14, 16 is required for performing leveling.

Figure 3:
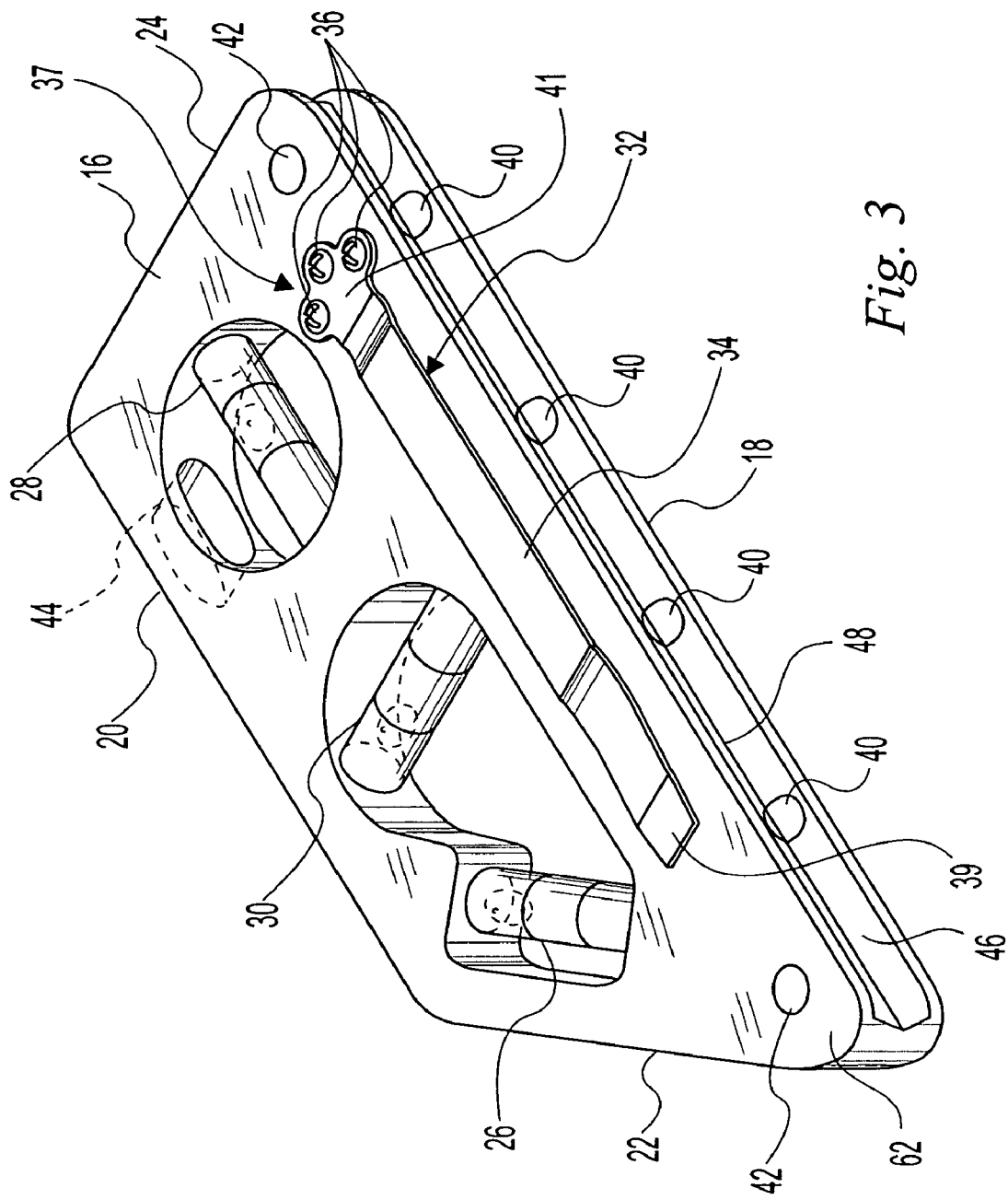
FIG. 3 shows a second-face perspective view of the leveling tool of FIG. 1 arranged in another configuration.

FIG. 3 illustrates another configuration of leveling tool 10 wherein removable clip assembly 32 is attached to the second face 16 of body 12 by use of the plurality of attachment members 36. FIG. 4 illustrates that removable clip 34 can be attached to either the first face 14 or the second face 16 of the embodiment of FIG. 3 by securing the attachments members 36 to the body 12. Specifically, the attachment members 36 are attached to the mating portion 37 of the first face 14 or to the mating portion 37 of the second face 16. The mating portions 37 in this embodiment are each a series of three holes 38 which are made into the thickness of the body 12. The holes 38 of the mating portions 37 are positioned to correspond to the relative positions of the attachment members 36 of the clip assembly 32. Regardless of whether clip 34 is attached to face 14 or to face 16, a distal end 39 of clip 34 may be closer than a proximal end 41 of clip 34 to first end surface 22.

As illustrated in FIGS. 3 and 4, first side surface 18 of the leveling tool may include a V-shaped groove 46 having a V-shaped cross section having an vertex 48 extending inward into the thickness. This V-shaped groove 46 allows the leveling tool 10 to be properly balanced and seated on a rounded, cylindrical or curved surface. For example, as is shown in FIG. 4, V-shaped groove 46 allows the leveling tool 10 to be seated with a high level of stability on a cylindrical pipe 50. In this view, it can be seen that the two sides of the V-shaped groove 46 define a third angle $\alpha_3$. This angle $\alpha_3$ is sized to allow the two sides of the V-shaped groove 46 to rest upon any curved surface having a radius 52 that is within a desired range.

In the embodiment shown, a V-shaped groove is provided in only side surface 18, the longest of surfaces 18, 20, 22 and 24. However, it is possible for any or all of surfaces 18, 20, 22 and 24 to include a V-shaped cutout portion or groove extending into the thickness of the body 12 to thereby allow tool 10 to more readily rest upon curved or rounded surfaces, such as the outer surfaces of pipes. Of course, it is also within the scope of the invention for none of surfaces 18, 20, 22 and 24 to include a V-shaped groove. That is, side surface 18 may be planar and perpendicular to faces 14, 16.

Referring back to FIG. 3, within the first side surface 18 of the body 12 are a plurality of magnets 40 spaced apart along the length of the first side surface 18. Regardless of whether first side surface 18 includes a V-shaped groove as illustrated, magnets 40 may be positioned substantially flush with the first side surface 18 such that magnets 40 partially define surface 18. Thus, magnets 40 may themselves be operationally exposed. As in the illustrated embodiment, magnets 40 may be disposed within the V-shaped cross section. In this embodiment, magnets 40 are substantially flush with the exposed sides of the V-shaped groove 46 such that magnets partially define V-shaped groove 46. In one embodiment, V-shaped groove 46 has a width of approximately 0.25 inch, and magnets 40 have a diameter of approximately 0.25 inch and a height of approximately 0.13 inch.

The illustrated embodiment includes a plurality of magnets 40 along first side surface 18. However, it is alternatively possible for the tool to include a single larger or longer magnet on first side surface 18.

Figure 6:
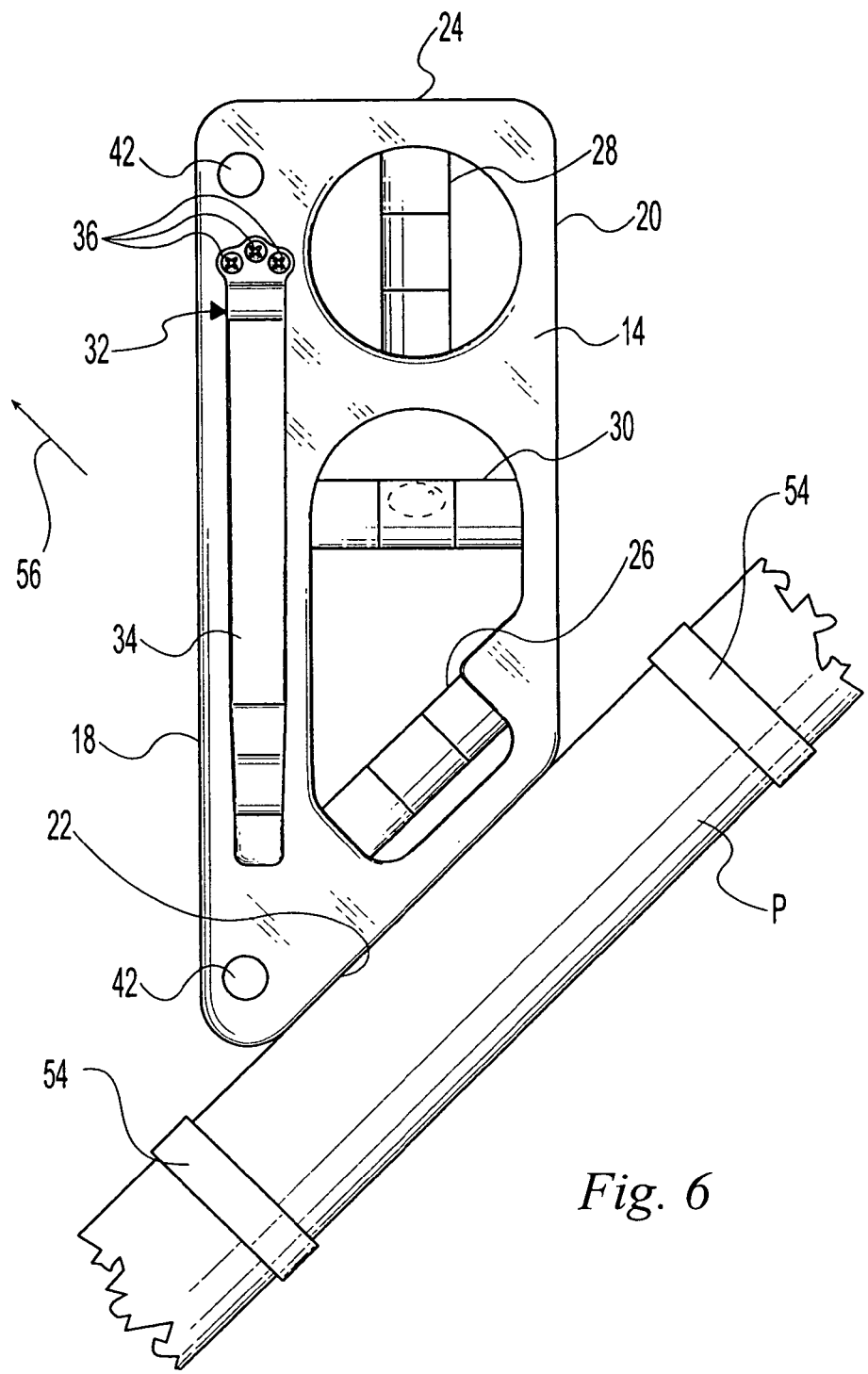
FIG. 6 shows a first face view of the leveling tool of FIG. 1 mounted on a pipe to be leveled.

As shown in FIGS. 3 and 6, the leveling tool 10 may also include a plurality of magnets 42 disposed within first and/or second face 14, 16. In the embodiment shown, magnets 42 are disposed adjacent opposite ends of first side surface 18. Magnets 42 may be substantially flush with the first and/or second face 14, 16 and may be operationally exposed.

Any or all of magnets 40, 42 may be high strength magnets such as rare earth magnets. In addition to or instead of magnets 40, 42, other magnets may be disposed on other surfaces of tool 10 or at other locations on the surfaces. For example, optional magnets 43, indicated in dashed lines in FIG. 2, may be provided in any or all of surfaces 20, 22, 24.

Tool 10 may also have a cutout portion 44 extending into the body 12 between the second side surface 20 and vial frame passage 31. The cutout portion 44 allows the second level vial 28 to be seen from second side surface 20. It may also be possible to provide a similar cutout portion for viewing vial 26. Such a cutout portion may extend into the body 12 between the first end surface 22 and vial frame passage 33.

During use, the leveling tool 10 is placed on a surface of a structure to determine whether the surface is level. If first side surface 18 is placed in the surface of the structure, the second level vial 28 may be read to determine the whether the surface is horizontal, third level vial 30 may be read to determine whether the pipe is vertical, and the first level vial 26 may be used to determine whether the surface is at a 45 degree angle or a 135 degree angle relative to the horizontal.

Surfaces may also be leveled at 45 degree and 135 degree angles by aligning and/or seating the first end surface 22 on the surface to be leveled and reading the third level vial 30, as shown in FIG. 6. Alternatively, second end surface 24 may be aligned and/or seated on the surface to be leveled such that first end surface 22 is generally horizontally oriented. Vial 26 can then be read while leveling the pipe surface at a 45 degree or a 135 degree angle. The relatively short surfaces 22, 24 allow tool 10 to be used in leveling a pipe surface that has only a few inches or less of flat surface available to receive a leveling tool. For example, pipe P in FIG. 6 may have only three inches or less of surface between fittings 54 that is straight or linear enough that a leveling tool may be seated thereon. Moreover, by virtue of the 45 degree and 135 degree angles that first end surface 22 forms with first side surface 18 and second side surface 20, respectively, tool 10 extends a shorter distance in a direction 56 perpendicular to the surface being leveled than would a similar rectangular level having two side surfaces of the same length as first side surface 18. Thus, because of its dimensions and shape, tool 10 may fit into smaller spaces in order to level a surface.

The plurality of magnets 40 allows the leveling tool 10 to be temporarily attached to magnetizable surfaces, such as magnetizable metal surfaces including steel. For example, the leveling tool 10 may be attached to a vertical steel support beam or pipe to determine whether the beam or pipe is perpendicular relative to the ground. In such a case, the third level vial 30, which is oriented perpendicular to the first side surface 18, may be observed to determine whether the beam is perpendicular to the ground.

Magnets 42 allow the user to temporarily attach the leveling tool 10 to a magnetizable structure and determine whether the structure is level while having his hands free. The user can then use his free hands to adjust the position of the magnetizable structure while observing the level vial until a level position is achieved. For example, magnets 42 on face 16, which are shown in FIG. 3, may be used to secure face 16 to a flange 58 indicated in dashed lines in FIG. 2. First side surface 18 may be aligned with the edges of throughholes 60 in flange 58. With magnets 42 retaining tool 10 on flange 58, the user has both hands free to rotate flange 58 until holes 60 are at the same vertical level, i.e., until the bubble shown in vial 28 in dashed lines is positioned between the line markings in the middle of vial 28. The user may then insert fastening elements (not shown), such as a bolts, through throughholes 60 to thereby attach flange 58 in a proper orientation to a pipe, for example.

The configuration of leveling tool 10 allows the tool 10 to be used in smaller spaces than traditional leveling tools. In cases where a surface is very close in proximity to other obstructing objects, the leveling tool 10 may be used to determine whether a surface is level,. For example, first side surface 18 may be placed upon the surface, and the view of vial 28 through vial frame passage 31 may be obstructed by surrounding objects. However, the user can still check whether the surface is level by viewing vial 28 through cutout portion 44.

Faces 14, 16 may be placed upon a surface to be leveled, or upon a surface having elements to be leveled, such as throughholes 60. If such a surface has a geometry that is better suited for or more easily receives one of faces 14, 16 than the other, clip 34 can be temporarily removed if necessary in order to accommodate the use of the preferred one of faces 14, 16. Moreover, a surface may be adjacent one or more obstructing objects that make it more difficult to place one of faces 14, 16 than the other of faces 14, 16 on the surface. In such a case, the user may use whichever one of first face 14 and second face 16 that is easier to place upon the surface. Thus tool 10 may be placed on and used on a surface wherein the clearance between the surface and other obstructing objects is very small.

Another advantage of clip 34 being removable and/or selectively attachable to faces 14, 16 is that tool 10 may be configured for either a left-handed user or a right-handed user. Tool 10 may be placed in a user's pocket such that clip 34 hangs on the lip of the pocket. For reasons of comfort, a right-handed user may wish to place tool 10 in his right front pants pocket such that the tool's longer side, i.e., first side surface 18, is positioned adjacent an outer edge of the pocket along his hip, and the tool's shorter side, i.e., second side surface 20, is positioned adjacent an inner edge of the pocket along his inseam. Thus, a right-handed user may fasten clip 34 on face 14 as shown in FIGS. 1–2. Conversely, a left-handed user may wish to place tool 10 in his left front pants pocket such that the tool's longer side, i.e., first side surface 18, is positioned adjacent an outer edge of the pocket along his hip, and the tool's shorter side, i.e., second side surface 20, is positioned adjacent an inner edge of the pocket along his inseam. Thus, a left-handed user may fasten clip 34 on face 16 as shown in FIG. 3.

Besides being configurable for the user's comfort, tool 10 is also easier for the user to place in his pocket. More specifically, a pointed tip 62 of tool 10 provides a wedge that is easily inserted between the lip of the pocket and the user's body and tends to push the lip of the pocket away from the user's body when the tool is being inserted into the pocket. Thus, tip 62 enables the user to easily guide the tool 10 into a pocket.

Clip 34 has been described herein as being removably attached to one of faces 14, 16 by clip attachment members in the form of screws 36. However, it is also possible for the clip to snap onto or otherwise be directly attachable to the body of the tool. For example, in one embodiment (not shown), a proximal end of the clip includes one or more resilient or spring-like members that removably snap into recesses on the faces of the tool.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A leveling tool comprising:
a substantially trapezoidal body including a first face and an opposite second face, said first and second faces defining a thickness therebetween, said thickness bordered by a first side surface, a second side surface opposite said first side surface, a first end surface, and a second end surface substantially opposite said first end surface, said first side surface having a first length greater than a second length of said second side surface, said first length being less than seven inches, said first and second side surfaces arranged parallel to one another, said first and second end surfaces arranged in non-parallel relationship to one another and extending contiguously between said first and second side surfaces, said first end surface defining a non-perpendicular first angle relative to said first side surface and a second non-perpendicular angle relative to said second side surface, said first length of said first side surface being between two and four times greater than a third length of said second end surface;
at least one level vial disposed within said thickness and visible from said first and second faces, wherein said at least one level vial includes a first level vial arranged parallel to said first end surface; and
a clip assembly removably attached to one of said first or second faces, said clip assembly including a clip and at least one clip attachment member, each of said first and second faces defining a mating portion engageable with said clip attachment member.

2. The leveling tool of claim 1 wherein said first angle measures about 45 degrees relative to said first side surface, and said second angle measures about 135 degrees relative to said second side surface.

3. The leveling tool of claim 1 further comprising a plurality of magnets disposed in said thickness, a first of said magnets being operably exposed on said first side surface, a second of said magnets being operably exposed on said second side surface, a third of said magnets being operably exposed on said first end surface, and a fourth of said magnets being operably exposed on said second end surface.

4. The leveling tool of claim 3 wherein a fifth of said magnets is operably exposed on said first side surface, a sixth of said magnets is operably exposed on said second side surface, a seventh of said magnets is operably exposed on said first end surface, and an eighth of said magnets is operably exposed on said second end surface.

5. The leveling tool of claim 1 wherein said first side surface defines a v-shaped cross section, wherein an vertex of said v-shaped cross section extends inward into said thickness.

6. The leveling tool of claim 1 further including at least one magnet disposed in said thickness and operably exposed within at least one of said first and second faces.

7. The leveling tool of claim 1 wherein said at least one level vial includes a second level vial arranged parallel to said first and second side surfaces, said second end surface defines a perpendicular angle relative to said first and second side surfaces, and said at least one level vial includes a third level vial arranged parallel to said second end surface.

8. The leveling tool of claim 1 wherein said body includes a rounded corner at a junction between said first side surface and said first end surface.

9. The leveling tool of claim 8 wherein said rounded corner has a radius of at least one-eighth inch.

10. A leveling tool comprising:
a body including a first face and an opposite second face, said first and second faces defining a thickness therebetween, said body defining a first side surface, a second side surface opposite said first side surface, a first end surface, and a second end surface substantially opposite said first end surface;
at least one level indicator disposed within said thickness; and
a clip removably attachable to each of said first and second faces.

11. The leveling tool of claim 10 wherein said first and second side surfaces are arranged parallel to one another, said first and second end surfaces are arranged in a non-parallel relationship to one another and extend contiguously between said first and second side surfaces, said first end surface defining a 45 degree angle relative to said first side surface and a 135 degree angle relative to said second side surface, and one of said at least one level indicator comprises a vial arranged parallel to said first end surface.

12. The leveling tool of claim 10 wherein said first side surface includes at least one magnet disposed in said thickness and positioned substantially flush with said first side surface.

13. The leveling tool of claim 10 wherein at least one of said first and second faces includes at least one magnet disposed in said thickness, operably exposed within said at least one of said first and second faces, and positioned substantially flush with said corresponding one of said first and second faces.

14. The leveling tool of claim 10 further comprising at least one clip attachment member configured to attach said clip to one of said first or second faces, each of said first and second faces defining an attachment member mating portion engageable with said clip attachment member.

* * * * *